(No Model.)
D. R. MATHENY.
COTTON PLOW.
No. 256,348. Patented Apr. 11, 1882.
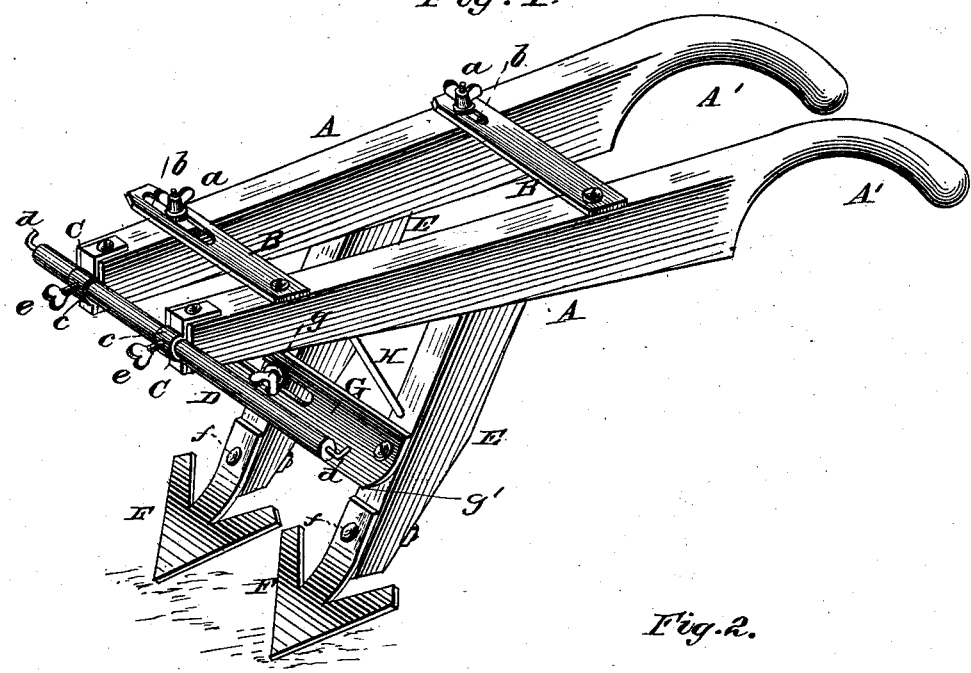
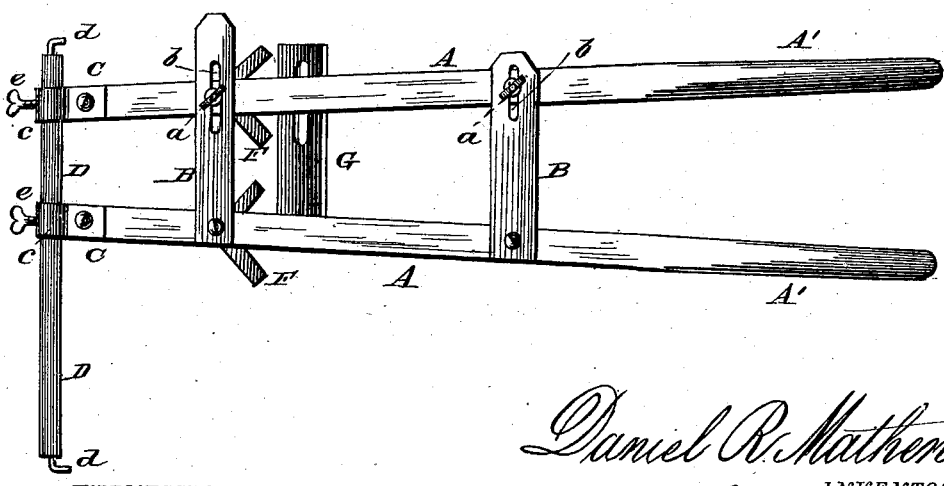
WITNESSES
Fred. G. Dieterich.
P. C. Dieterich.
Daniel R. Matheny
INVENTOR,
by Louis Bagger & Co.
Attorneys

UNITED STATES PATENT OFFICE.

DANIEL R. MATHENY, OF BLACKVILLE, SOUTH CAROLINA.

COTTON-PLOW.

SPECIFICATION forming part of Letters Patent No. 256,348, dated April 11, 1882.

Application filed January 10, 1882. (No model.)

*To all whom it may concern:*

Be it known that I, DANIEL R. MATHENY, of Blackville, in the county of Barnwell and State of South Carolina, have invented certain new and useful Improvements in Cotton-Plows; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved cotton-plow, and Fig. 2 is a top view of the same.

Similar letters of reference indicate corresponding parts in both the figures.

My invention has relation to cotton-plows, or cleaners for plowing cotton the first and second times after planting; and it consists in the detailed construction and combination of parts of a straddle-row plow, as hereinafter more fully set forth, and particularly pointed out in the claim.

In the annexed drawings, the letters A A represent the plow-beams, which are parallel to each other and connected by bars B B, which are slotted at $b\ b$, so that by loosening the set-screws $a\ a$, inserted through the slotted connecting-bars into one of the plow-stocks, the distance between the latter may be regulated at will to conform to the width of the row of plants to be plowed and cleaned. The rear ends of the beams are shaped to form handles A' A', and in their front ends are affixed plates C C, cast or shaped with eyes $c\ c$ for the insertion of the whiffletree D, in the end hooks, $d\ d$, of which the traces are secured. The whiffletree extends a greater distance to one side of the plow than to the other, so that in operating the implement the horse will walk on one side of the row while the plows straddle it. The tree D may be secured rigidly in this one-sided position by means of set-screws $e$, inserted through the sleeves or eyes $c$, and bearing with their inner ends against the tree.

E E are the plow-standards, to the lower ends of which are attached, by bolts $f f$, the sweeps or plows F F, which are of the shape clearly shown in the drawings. By loosening bolts $f$ the angles of the plows may be adjusted so as to present a more or less oblique edge to the row. The standards E E are connected adjustably to each other, in like manner as the plow-stocks A A, by a slotted cross-bar, G, through the slot of which works a set-screw, $g$.

H H are braces connecting the standards with the stocks.

The lower portion of the cross-bar G curves forward, and is provided with a cutting-edge, $g'$, which is adapted to lop off the plants at the same time they are being plowed or cultivated, and this feature of the slotted cross-bar is deemed to be important, serving the two functions specified.

It will be seen that this plow is exceedingly simple and inexpensive in its construction, dispenses with a pole or tongue by applying the draft directly to the plow-stocks, and can be adjusted in a moment of time and in the field to any width of row. By working both sides of the row at the same time it saves both time and labor.

Having thus described my invention, I claim and desire to secure by Letters Patent of the United States—

The combination, in a cotton-plow, of the handle-beams A A', the standards E, the one-sided whiffletree D, adjustable on the beams, the slotted cross-bars B B, and the adjusting cross-bar and cutter G, substantially as shown and described.

In testimony that I claim the foregoing as my own I have hereunto affixed my signature in presence of two witnesses.

DANIEL RUSH MATHENY.

Witnesses:
   J. P. O'NEILL,
   JOHN W. MATHENY.